Oct. 17, 1950    S. A. WILLIAMSON    2,525,987
ROTARY DOUGHNUT CUTTER
Filed Sept. 29, 1947    2 Sheets-Sheet 1
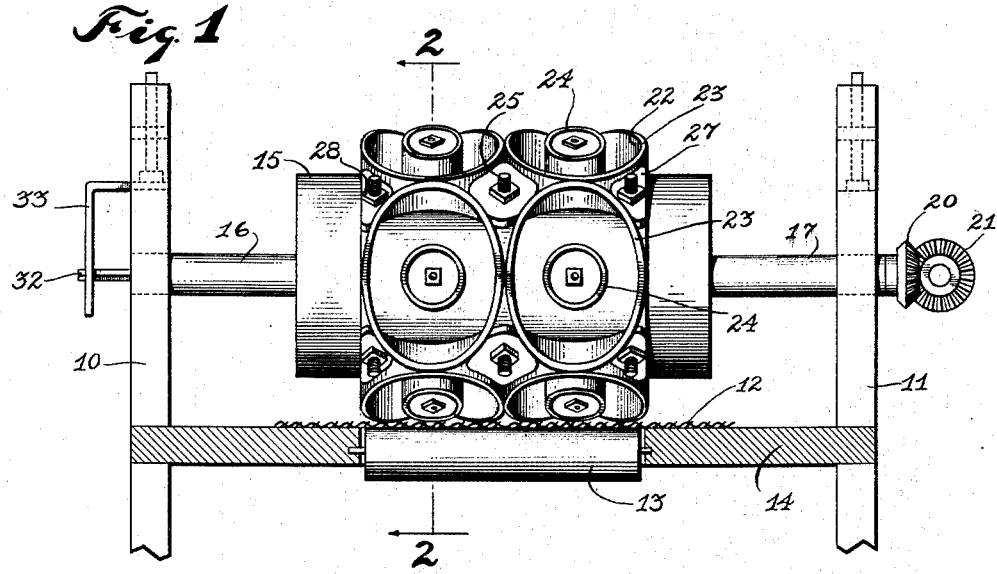
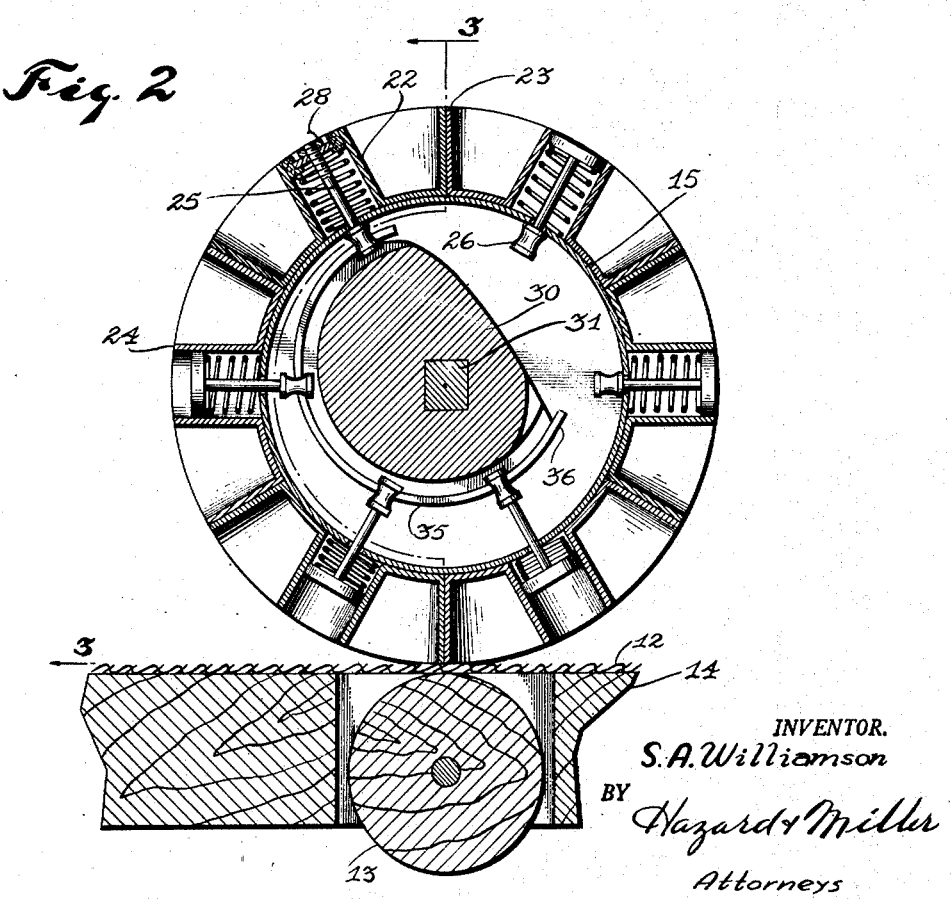
INVENTOR.
S. A. Williamson
BY Hazard & Miller
Attorneys Oct. 17, 1950     S. A. WILLIAMSON     2,525,987
ROTARY DOUGHNUT CUTTER Filed Sept. 29, 1947     2 Sheets-Sheet 2

INVENTOR.
S. A. Williamson
BY Hazard & Miller
Attorneys

Patented Oct. 17, 1950

2,525,987

UNITED STATES PATENT OFFICE 2,525,987

ROTARY DOUGHNUT CUTTER

Sophus Adolph Williamson, Los Angeles, Calif.

Application September 29, 1947, Serial No. 776,815

3 Claims. (Cl. 107—23)

This invention relates to improvements in doughnut cutters and similar devices designed to cut doughnuts or like pastries from a layer of doughnut or pastry dough.

An object of the invention is to provide an improved doughnut cutter generally in the form of a hollow cylinder on the exterior of which there are cutting edges designed to cut the doughnut or like pastry from a sheet or layer of dough carried beneath the cutter on a traveling supporting belt. In the cutting of doughnuts and like pastries there are what may be termed waste areas between adjacent doughnuts cut from the dough and in the case of doughnuts there are waste areas where the holes are cut through the centers of the doughnuts. These waste portions of the dough are usually relatively small and are apt to cling to the sides of the cutting edges.

More specifically an object of the invention is to provide a rotary cutter wherein ejectors are arranged behind these waste areas which are automatically retracted during the rotation of the cutter as their respective cutting edges approach the locality where the cutting occurs and which after their cutting edges have passed by the locality of cutting are caused to quickly be forced outwardly to expel the waste portions from the bottom of the cutting edges and in a direction in which the waste portions may be recovered and returned for reuse in the forming of another dough layer.

Another object of the invention is to provide a doughnut cutter having the above mentioned characteristics which is of relatively simple and durable construction having relatively few moving parts and which will be highly efficient in its operation.

With the foregoing and other objects in view, which will be made manifest in the following detailed description and specifically pointed out in the appended claims, reference is had to the accompanying drawings for an illustrative embodiment of the invention, wherein:

Fig. 1 is a view through a doughnut cutting machine illustrating the cutter embodying the present invention in side elevation thereon;

Fig. 2 is a vertical section taken substantially upon the line 2—2 upon Fig. 1 in the direction indicated;

Figure 3:
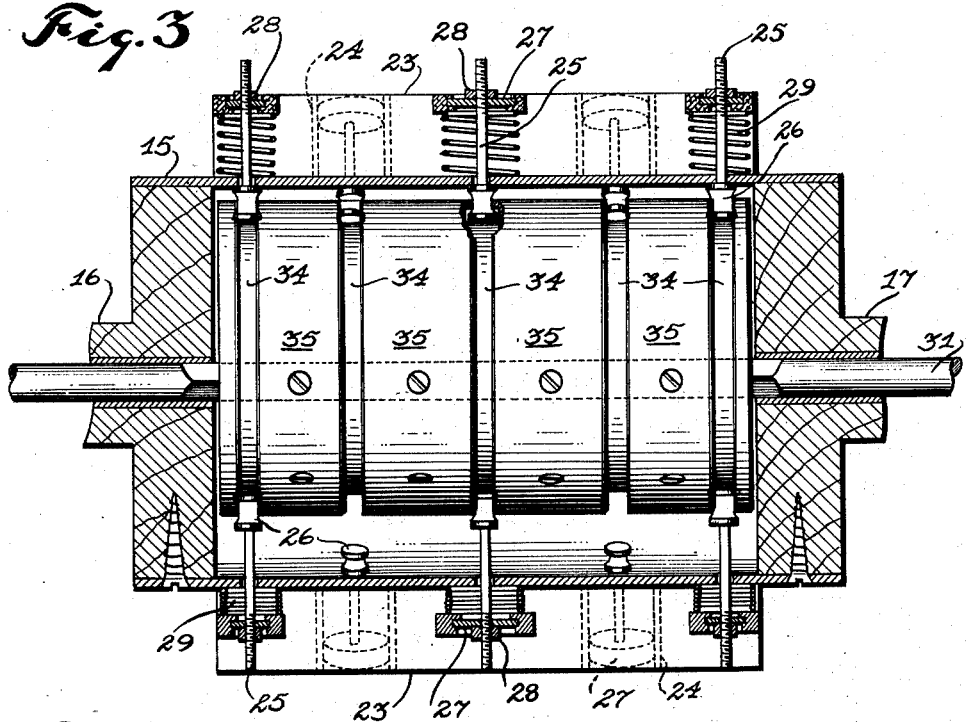
Fig. 3 is a sectional view taken substantially upon the line 3—3 upon Fig. 2 in the direction indicated.
Figure 4:
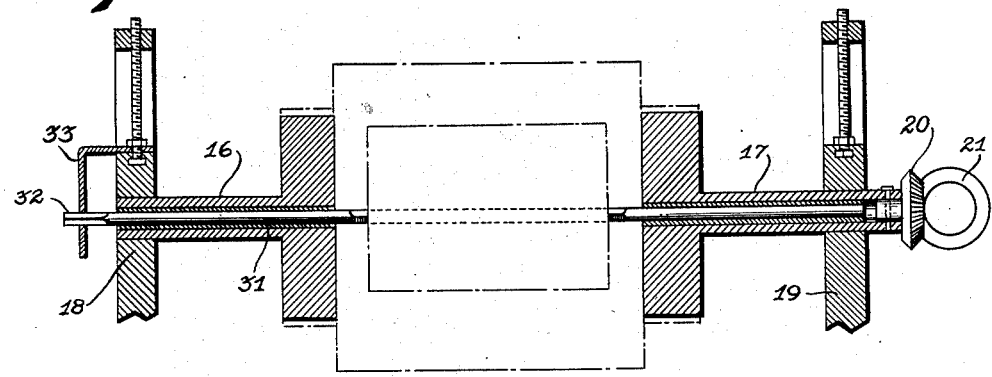
Fig. 4 is a sectional view through the mounting employed for the cutter.

Referring to the accompanying drawings wherein similar reference characters designate similar parts throughout, the cutter embodying the present invention is mounted for rotation on a pair of standards or supports 10 and 11 between which there is disposed a conveyor belt 12 adapted to be supported on one or more rollers 13 that assist in conducting the belt across a table 14. A layer of doughnut or pastry dough (not shown) of uniform thickness is deposited on the belt 12 and carried thereby beneath the rotary cutter.

The cutter embodying the present invention comprises a cylindrical member 15 carrying trunnions 16 and 17 on its ends which are rotatably mounted on the standards 10 and 11 as indicated at 18 and 19. One of these trunnions may carry a bevel gear 20 which meshes with a companion bevel gear 21 driven by a suitable source of power so as to rotate the cutter at the same speed of rotation as the speed of travel of the belt 12. Cutters 22 are detachably secured to the exterior of the cylinder 15 and in the case of doughnut cutters these cutters provide outer circular cutting edges 23 and inner circular cutting edges 24 concentric with the outer cutting edges 23. The outer cutting edges 23 are designed to cut through the layer of dough on the belt 12 and to thus define the outer sides of the doughnut. The inner cutting edges 24 serve to cut a hole through the circular disc of dough cut by the outer edges 23 and thus form the hole through the doughnut. The areas within the inner cutting edges 24 and between adjacent outer cutting edges 23 may be deemed waste areas in that the portions of the dough cut from the layer within the inner cutting edges 24 and between adjacent outer cutting edges 23 are not used except for purposes of returning to the mechanism, not shown, in the preparation of additional dough layer that is supplied to the belt 12.

Behind these areas that may be deemed waste areas as above explained there are ejectors; each ejector consisting of a stem 25 slidably extending through the cylindrical member 15 and having on its inner end a head 26. On the outer ends of the stems there are mounted pistons 27 which may be adjusted along the lengths of the stems by means of nuts 28. Compression springs 29 are compressed between the pistons 27 and the cylindrical member 15 and serve to normally urge the pistons and stems into their outermost positions wherein the heads bear against the interior of the cylindrical member 15.

Within the cylindrical member there is disposed a cam generally indicated at 30. This cam is held stationary by means of a shaft 31 on which the cam is mounted. The ends of this shaft extend into the hollow trunnions 16 and 17 and one end of this shaft is held against rotation such as by a squared portion as indicated at 32 and extending into the square hole in a bracket 33 mounted on the standard 10. On the exterior of the cam there are circumferentially extending grooves 34 the entrances to which are somewhat narrowed or restricted by means of plates 35. The spacing between adjacent edges of adjacent plates is such as to barely permit the narrowed portions or connections of the heads 26 to enter therebetween. As shown on Fig. 2 the top of the cam is disposed rather close to the under side of the top of the cylinder 15 whereas the bottom of the cam is disposed more remote from the bottom of the cylinder 15. The plates 35 terminate at 36 which is at a point disposed somewhat beyond the location of cutting of the dough on the belt.

The operation of the above described construction is substantially as follows. The dough is fed over the belt 12 in a substantially uniform layer and as viewed in Fig. 2 may be regarded as moving from left to right. As the belt moves the rotary cutter is caused to rotate by means of the gears 20 and 21 at the same linear speed so that as the dough passes beneath the cutter the cutting edges 23 and 24 will cut the dough into the desired doughnut shapes. During the rotation of the cutter with relation to the stationary cam 30 the heads 26 will enter the tops of the grooves 34 between the plates 35 and as the spacing between the plates 35 is just equal to the narrowed or restricted portions of the heads as rotation continues the ejectors will be gradually retracted from the position shown at the top of Fig. 2 to a position as shown at the bottom of this figure. Consequently, when the cutting edges with which the ejectors are associated approach the locality where cutting takes place the ejectors are cammed into their fully retracted positions. When the dough is cut those portions of the dough that are opposite the waste areas within the inner cutting edges 24 and between adjacent outer cutting edges 23 are relatively small in size and may stick to the sides of their respective cutters. As the cutter continues its rotation the heads eventually pass beyond the ends 36 of the plates 35 and when the heads pass beyond the ends 36 they are then released allowing the compression springs 29 to suddenly force the ejectors outward. This release of the ejectors takes place at a time and in a position wherein their outward movement is directed otherwise than toward the belt 12 and as depicted in Fig. 2 the direction is substantially horizontal. Those portions of dough that are between the adjacent cutting edges 23 and within the inner cutters 24 will thus be quickly expelled or ejected by the ejectors.

It is not essential that the pistons of the ejectors fit between their associated cutting edges closely. A reasonably close fit is, of course, normally desirable but it is not essential. In many instances there is sufficient volume of air between the waste portions of the dough and the pistons of the ejectors so that the waste portions are in effect blown out from between their cutting edges without being actually contacted by the ejectors. From the above described construction it will be appreciated that an improved doughnut cutter is provided enabling doughnuts to be easily and quickly cut from a traveling layer of dough. The cut doughnuts are normally left on the belt 12 but the waste portions of the dough usually stick to the side walls of their associated cutters. These waste portions are suddenly expelled or ejected after the cutting action is completed and in a direction so that they may be conveniently collected and returned for reuse in the formation of additional dough layer. While the invention has been primarily designed for cutting doughnuts it will be appreciated that it is not necessarily restricted thereto but may be advantageously employed in the cutting of other pastry products from dough layers.

Various changes may be made in the details of construction without departing from the spirit and scope of the invention as defined by the appended claims.

I claim:

1. A device in the class described comprising a frame, a cutter mounted for rotation on the frame having cutting edges thereabouts adapted to cut pastries from a layer of dough passing therebeneath, the cutting edges being shaped so as to cut doughnut shaped pieces from the pastry, ejectors arranged on the cutter behind all the waste areas defined by the cutter, each ejector consisting of a slidable stem carrying a piston, spring means urging the piston and stem outwardly, heads on the stems limiting outward movement to the stems with relation to the cutter and a cam within the cutter fixed to the frame having peripheral grooves thereabouts, the grooves being reduced at the radial entrances thereof, there being longitudinal entrances to the grooves at the ends thereof, the heads of the ejectors being receivable within the longitudinal entrances of the grooves and being retracted as the cutting edges associated therewith approach cutting position, the grooves terminating at a position at approximately right angles from cutting position whereby the ejectors are released and are caused to move outwardly by the springs thereof to eject the waste dough.

2. A device of the class described comprising a frame, a cutter mounted for rotation on the frame and having cutting edges thereabouts adapted to cut pastries from a layer of dough passing therebeneath, the cutting edges being arranged on the cutter to divide the dough into a plurality of large pieces and a plurality of small waste pieces interspersed between the large pieces, ejectors arranged on the cutter only behind the waste areas defined by the cutter, each ejector consisting of a slidable stem carrying a piston, spring means urging the piston and stem outwardly, heads on the stems limiting outward movement of the stem with relation to the cutter, and a cam within the cutter fixed to the frame having peripheral grooves thereabouts, the grooves being reduced at the radial entrances thereof, there being longitudinal entrances to the grooves at the ends thereof, the heads of the ejectors being receivable within the longitudinal entrances of the grooves and being retracted as the cutter edges associated therewith approach cutting position.

3. A device as set out in claim 2 in which the grooves terminate at a position approximately at right angles from the cutting position whereby the ejectors are released and are caused to move outwardly by the springs thereof to eject the waste dough.

SOPHUS ADOLPH WILLIAMSON.

REFERENCES CITED

The following references are of record in the file of this patent:

UNITED STATES PATENTS

| Number | Name | Date |
|---|---|---|
| 689 | Heagle | Apr. 13, 1838 |
| 2,344 | Nevins | Nov. 10, 1841 |
| 870,249 | Patterson | Nov. 5, 1907 |
| 1,656,590 | Longstreth et al. | Jan. 17, 1928 |
| 1,945,755 | Scruggs | Feb. 6, 1934 |

FOREIGN PATENTS

| Number | Country | Date |
|---|---|---|
| 11,128 | Great Britain | June 30, 1891 |